(12) United States Patent
Shimamoto

(10) Patent No.: US 9,672,059 B2
(45) Date of Patent: Jun. 6, 2017

(54) VIRTUALIZATION SYSTEM

(71) Applicant: NEC Corporation, Tokyo (JP)

(72) Inventor: Hiroshi Shimamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/768,942

(22) PCT Filed: Feb. 19, 2014

(86) PCT No.: PCT/JP2014/000839
§ 371 (c)(1),
(2) Date: Aug. 19, 2015

(87) PCT Pub. No.: WO2014/129184
PCT Pub. Date: Aug. 28, 2014

(65) Prior Publication Data
US 2016/0004550 A1    Jan. 7, 2016

(30) Foreign Application Priority Data

Feb. 21, 2013   (JP) .................................. 2013-031731

(51) Int. Cl.
*G06F 9/455* (2006.01)
*G06F 9/54* (2006.01)
(Continued)

(52) U.S. Cl.
CPC ........ *G06F 9/45558* (2013.01); *G06F 9/5072* (2013.01); *G06F 9/547* (2013.01);
(Continued)

(58) Field of Classification Search
None
See application file for complete search history.

(56) References Cited

U.S. PATENT DOCUMENTS 6,445,704 B1 * 9/2002 Howes ................. H01R 31/005
370/392
7,213,246 B1   5/2007 van Rietschote et al.
(Continued)

FOREIGN PATENT DOCUMENTS

JP   2008-293358   12/2008
JP   2009-157785   7/2009
(Continued)

OTHER PUBLICATIONS

International Search Report mailed Apr. 1, 2014 in corresponding PCT International Application.
(Continued)

*Primary Examiner* — Emerson Puente
*Assistant Examiner* — Mehran Kamran
(74) *Attorney, Agent, or Firm* — Finnegan, Henderson, Farabow, Garrett & Dunner, L.L.P.

(57) ABSTRACT

A virtualization system includes: a virtualizing means for activating a virtual machine to which identification information identifying the virtual machine is assigned and which is capable of executing a predetermined function; a plurality of virtual machines activated by the virtualizing means; and a correspondence table creating means for creating a function correspondence table in which the identification information assigned to each of the virtual machines is associated with a function to be executed by the virtual machine among functions that can be executed by the virtual machines. The virtual machine specifies an associated function in the function correspondence table on the basis of the identification information assigned to the virtual machine, and executes the specified function.

20 Claims, 10 Drawing Sheets

(51) Int. Cl.
*G06F 9/50* (2006.01)
*G06F 11/20* (2006.01)

(52) U.S. Cl.
CPC .. *G06F 11/2038* (2013.01); *G06F 2009/4557* (2013.01); *G06F 2009/45595* (2013.01); *G06F 2201/815* (2013.01)

(56) References Cited

U.S. PATENT DOCUMENTS

| | | | |
|---|---|---|---|
| 2008/0294937 A1 | 11/2008 | Ueda | |
| 2009/0125902 A1* | 5/2009 | Ghosh | G06F 9/45533 718/1 |
| 2009/0187775 A1* | 7/2009 | Ishikawa | G06F 1/3203 713/310 |
| 2009/0307761 A1* | 12/2009 | Iyoda | G06F 9/468 726/4 |
| 2009/0327462 A1* | 12/2009 | Adams | G06F 9/5077 709/222 |
| 2010/0070980 A1* | 3/2010 | Tanaka | G06F 9/4443 719/318 |
| 2010/0083251 A1* | 4/2010 | McCrory | G06F 9/455 718/1 |
| 2010/0153945 A1* | 6/2010 | Bansal | G06F 9/4881 718/1 |
| 2010/0235835 A1* | 9/2010 | Nishiguchi | G06F 9/485 718/1 |
| 2011/0029652 A1* | 2/2011 | Chhuor | G06F 9/45541 709/223 |
| 2011/0239216 A1* | 9/2011 | Miyajima | G06F 9/455 718/1 |
| 2011/0239268 A1* | 9/2011 | Sharp | G06F 9/45558 726/1 |
| 2012/0017211 A1* | 1/2012 | Ohno | G06F 9/5077 718/1 |
| 2012/0117566 A1* | 5/2012 | Maeda | G06F 21/53 718/1 |
| 2012/0180049 A1* | 7/2012 | Tsai | G06F 9/45558 718/1 |
| 2012/0185799 A1* | 7/2012 | Tsai | G06F 9/45558 715/804 |
| 2012/0260250 A1* | 10/2012 | Maeda | G06F 21/53 718/1 |
| 2012/0272241 A1 | 10/2012 | Nonaka et al. | |
| 2012/0331465 A1* | 12/2012 | Tanikawa | G06F 9/5077 718/1 |
| 2013/0086236 A1* | 4/2013 | Baucke | H04L 45/50 709/223 |
| 2013/0143544 A1* | 6/2013 | Noda | H04W 4/001 455/418 |
| 2013/0204933 A1* | 8/2013 | Cardona | G06F 9/542 709/204 |
| 2013/0283273 A1* | 10/2013 | Miyazaki | G06F 9/45533 718/1 |
| 2014/0123140 A1* | 5/2014 | Motoki | G06F 9/45533 718/1 |
| 2014/0298337 A1* | 10/2014 | Anderson | G06F 9/5077 718/1 |

FOREIGN PATENT DOCUMENTS

| | | |
|---|---|---|
| JP | 2009-211517 | 9/2009 |
| JP | 2010-271863 | 12/2010 |
| JP | 2012-150657 | 8/2012 |
| JP | 2012-230721 | 11/2012 |

OTHER PUBLICATIONS

Extended European Search Report mailed Aug. 11, 2016, by the European Patent Office in counterpart European Patent Application No. 14754401.9.

\* cited by examiner

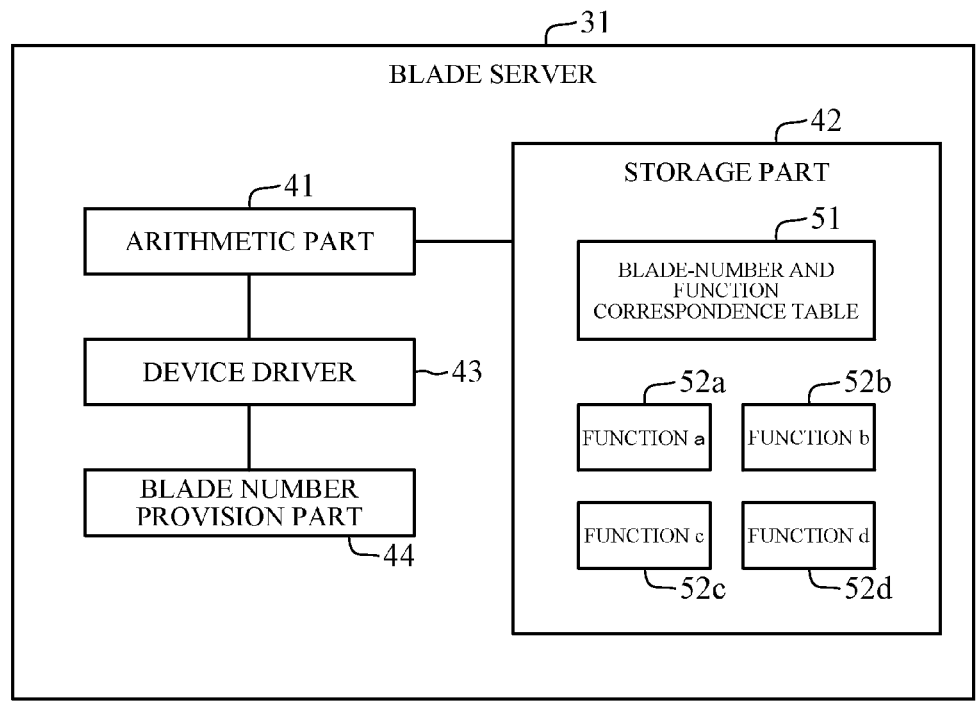

Fig.7

| MAC ADDRESS | FUNCTION |
|---|---|
| xxxx:01 | FUNCTION a |
| xxxx:02 | FUNCTION b |
| xxxx:03 | FUNCTION c |
| xxxx:04 | FUNCTION d |
| xxxx:05 | FUNCTION a |
| xxxx:06 | FUNCTION b |
| xxxx:07 | FUNCTION c |
| xxxx:08 | FUNCTION d |

VIRTUALIZATION SYSTEM

CROSS-REFERENCE TO RELATED PATENT APPLICATIONS

This application is a National Stage Entry of International Application No. PCT/JP2014/000839, filed Feb. 19, 2014, which claims priority from Japanese Patent Application No. 2013-031731, filed Feb. 21, 2013. The entire contents of the above-referenced applications are expressly incorporated herein by reference.

TECHNICAL FIELD

The present invention relates to a virtualization system, and particularly relates to a virtualization system which virtualizes a core network.

BACKGROUND ART

There is a known technique of a mobile core network, which is a large-scale communication network that connects base stations in a mobile phone network or the like or telecom carriers. Each node executing a necessary function in such a mobile core network is configured, for example, on a blade server system for communication equipment. A function executed by each node is the session connecting function, the load balancing function and so on.

The blade server system has redundant power supplies and redundant network wiring in order to increase reliability as a communication network device. Moreover, the blade server system has redundant blade servers operating therein, and the blade servers are divided into active or standby. Such a blade server system is configured to, in case of occurrence of a failure such as power-off in an active system, carry over processing to a standby system connected to a different power supply from a power supply connected to the active system.

Moreover, in the blade server system having the plurality of functions described above, a function which each of the blade servers is to execute is assigned to the blade server. To be specific, a predetermined function is assigned to identification information of hardware of each of the blade servers. For example, the session connecting function is assigned to identification information of one of the blade servers, and the load balancing function is assigned to identification information of another one of the blade servers. Each of the blade servers specifies a function assigned thereto from identification information of the blade server and executes the function.

Further, there is a known technique of utilizing a server virtualizing an active system and a server virtualizing a standby system, by using a virtualization technique for effectively using hardware resources.

Patent Document 1: Japanese Unexamined Patent Application Publication No. 2009-157785

However, in such a blade server system in which a function is assigned to each of the blade servers as described above, in a case where the blade server is virtualized, execution of the function assigned to the blade server may be difficult. For example, because a server device performing virtualization activates a plurality of virtual machines on the server device, any of the virtual machines may be unable to specify a function which the virtual machine is to execute from identification information of hardware of the server device and may be unable to execute the function. As a result, the blade server system described above has a problem that virtualization of the blade servers is difficult and hardware resources cannot be effectively used.

SUMMARY

Accordingly, an object of the present invention is to provide a virtualization system which can solve the above-mentioned problem that hardware sources cannot be effectively used.

In order to achieve the object, a virtualization system as an aspect of the present invention includes:

a virtualizing means for activating a virtual machine to which identification information identifying the virtual machine is assigned and which is capable of executing a predetermined function;

a plurality of virtual machines activated by the virtualizing means; and a correspondence table creating means for creating a function correspondence table in which the identification information assigned to each of the virtual machines is associated with a function to be executed by the virtual machine among functions that can be executed by the virtual machines.

The virtual machine specifies an associated function in the function correspondence table on a basis of the identification information assigned to the virtual machine, and executes the specified function.

Further, an information processing method of a virtualization system as another aspect of the present invention includes:

activating a plurality of virtual machines to each of which identification information identifying the virtual machine is assigned and each of which is capable of executing a predetermined function; and creating a function correspondence table in which the identification information assigned to each of the virtual machines is associated with a function to be executed by the virtual machine among functions that can be executed by the virtual machines.

The virtual machine specifies an associated function in the function correspondence table on a basis of the identification information assigned to the virtual machine, and executes the specified function.

Further, an information processing device as another aspect of the present invention includes:

a correspondence table creating means for creating a function correspondence table in which identification information identifying each of a plurality of virtual machines is associated with a function to be executed by the virtual machine among functions that can be executed by the virtual machines; and an identification information assigning means for giving an instruction to activate the respective virtual machines to which the identification information associated with a same function in the function correspondence table created by the correspondence table creating means are assigned, to different server devices among a plurality of server devices activating the virtual machines.

Further, an information processing method of an information processing device as another aspect of the present invention includes:

creating a function correspondence table in which identification information identifying each of a plurality of virtual machines is associated with a function to be executed by the virtual machine among functions that can be executed by the virtual machines; and giving an instruction to activate the respective virtual machines to which the identification information associated with a same function in the created function correspondence table are assigned, to different server devices among a plurality of server devices activating the virtual machines.

Further, a computer program as another aspect of the present invention is a computer program including instructions for causing an information processing device to realize:

a correspondence table creating means for creating a function correspondence table in which identification information identifying each of a plurality of virtual machines is associated with a function to be executed by the virtual machine among functions that can be executed by the virtual machines; and an identification information assigning means for giving an instruction to activate the respective virtual machines to which the identification information associated with a same function in the function correspondence table created by the correspondence table creating means are assigned, to different server devices among a plurality of server devices activating the virtual machines.

With the configurations as described above, the present invention enables effective use of hardware resources.

BRIEF DESCRIPTION OF DRAWINGS

FIG. 3 is a block diagram showing the configuration of a blade server;

FIG. 4 is a view showing an example of a blade-number and function correspondence table;

FIG. 7 is a view showing an example of a MAC-address and function correspondence table;

EXEMPLARY EMBODIMENTS

<First Exemplary Embodiment>

Figure 1:
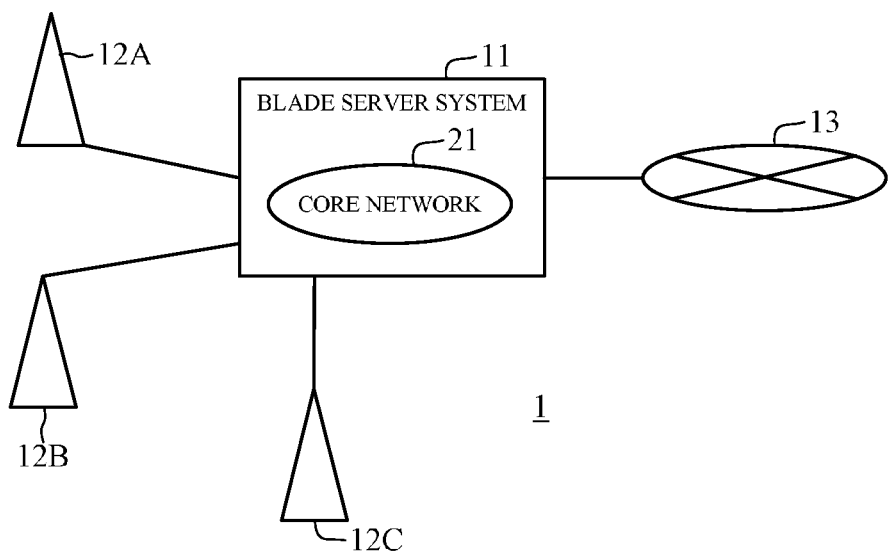
FIG. 1 is a block diagram showing the configuration of a mobile core network system.

First, the configuration of a mobile core network system 1 relating to the present invention will be described. The mobile core network system 1 shown in FIG. 1 includes a blade server system 11, base stations 12A to 12C, and a communication network 13. The base stations 12A to 12C each control communication with a user terminal such as a mobile phone (not shown in the drawings). The communication network 13 is a landline telephone network, a mobile phone network of another carrier, the Internet, or the like.

The blade server system 11 configures a core network 21 and executes connection processing between user terminals and the base stations 12A to 12C, or between user terminals and the communication network 13. The number of the base stations 12 is not limited to three, and may be one or two and may be four or more.

Figure 2:
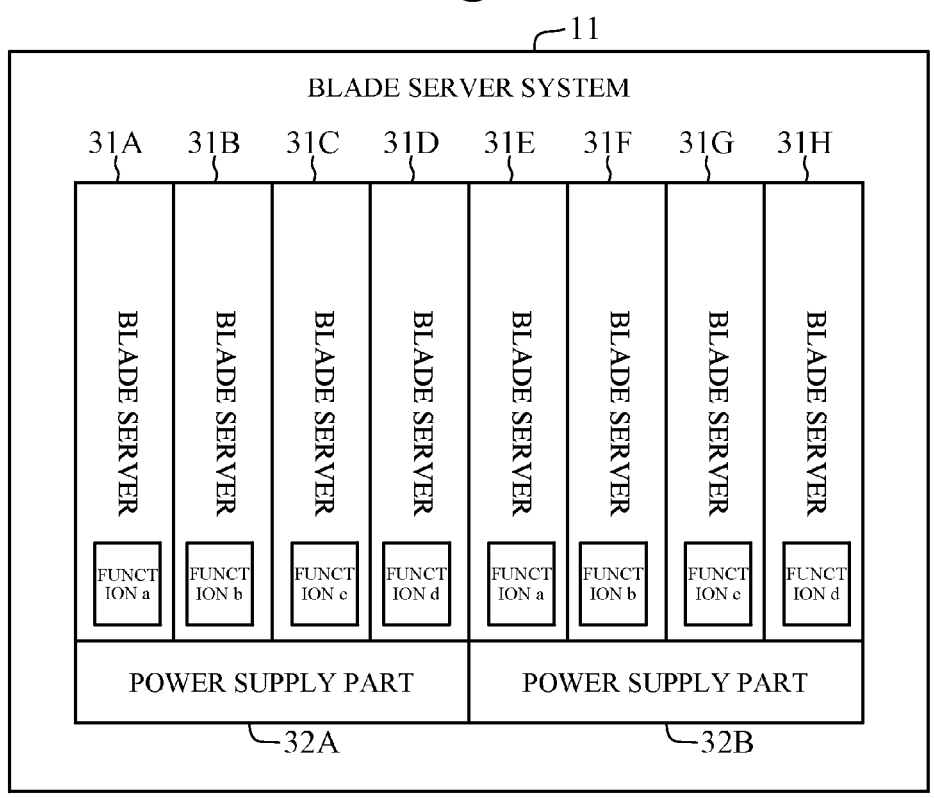
FIG. 2 is a block diagram showing the configuration of a blade server system.

The blade server system 11 configuring the core network 21 will be described below. FIG. 2 is a block diagram showing the configuration of the blade server system 11. The blade server system 11 shown in FIG. 2 includes eight blade servers 31, namely, blade servers 31A to 31H, a power supply part 32A connected to the blade servers 31A to 31D, and a power supply part 32B connected to the blade servers 31E to 31H.

In this example, the blade server system 11 configuring the core network 21 has four functions; functions a to d. The functions are, for example, the session management function of a mobile phone and the like, the load balancing function, and the location information management function of a mobile phone and the like. For example, the blade servers 31A and 31E each have the "function a," the blade servers 31B and 31F each have the "function b," the blade servers 31C and 31G each have the "function c," and the blade servers 31D and 31H each have the "function d." Therefore, for example, the blade servers 31A to 31D connected to the power supply part 32A operate as active server devices executing the functions a to d, respectively. The blade servers 31E to 31H connected to the power supply part 32B operate as standby server devices executing the functions a to d, respectively.

Next, a specific configuration of each of the blade servers 31 will be described. FIG. 3 is a block diagram showing an example of the configuration of the blade server 31. The blade server 31 includes an arithmetic part 41, a storage part 32, a device driver 43, and a blade number provision part 44. The arithmetic part 41 is configured by a CPU (Central Processing Unit), for example.

Each of the blade servers 31 is provided with a blade number for identifying the blade server 31, and the blade number provision part 44 holds preset blade numbers. For example, the blade server 31A is provided with a blade number "1." Likewise, the blade servers 31B to 31H are provided with blade numbers "2" to "8," respectively. Further, the storage part 42 previously stores a blade-number and function correspondence table 51 (see FIG. 4, for example) which associates blade numbers (for example, the blade numbers 1 to 8) with functions executed by the blade servers 31, and a plurality of functions 52a to 52d (for example, the functions a to d).

The arithmetic part 41 retrieves a blade number from the blade number provision part 44 via the device driver 43. For example, the arithmetic part 41 retrieves the blade number "1." Then, the arithmetic part 41 refers to the blade-number and function correspondence table 51 (for example, FIG. 4) stored in the storage part 42, and specifies and executes a function associated with the retrieved blade number. For example, the arithmetic part 41 specifies the "function a" associated with the blade number "1" and executes the "function a." A case of virtualizing the blade server system 11 described above will be described below.

Figure 9:
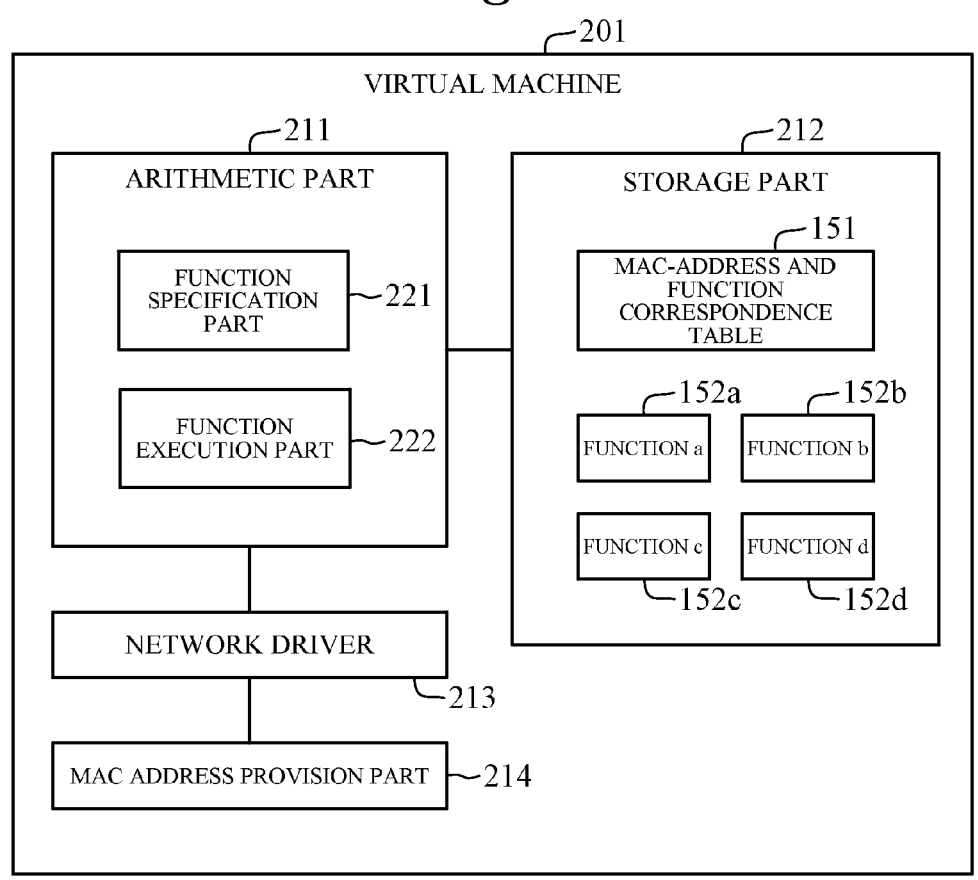
FIG. 9 is a block diagram showing the configuration of a virtual machine.
Figure 10:
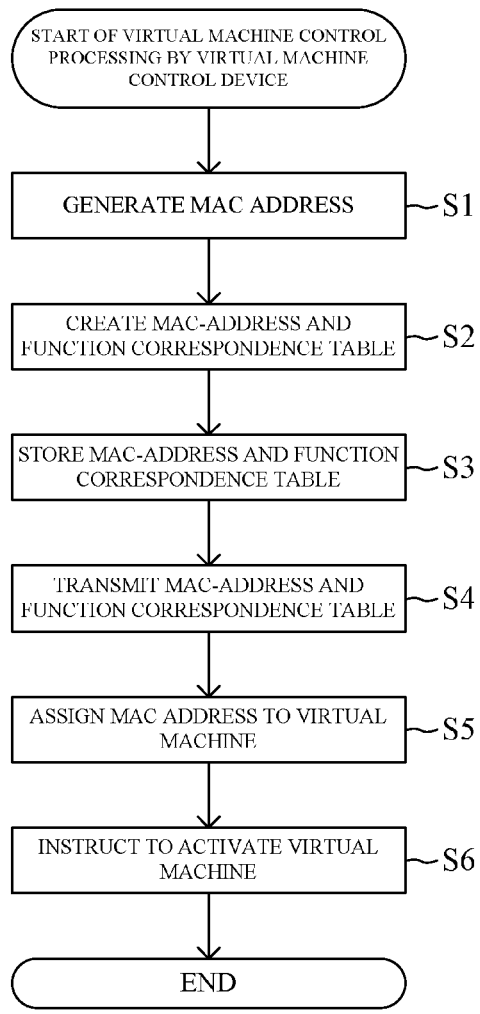
FIG. 10 is a flowchart for describing virtual machine control processing.
Figure 11:
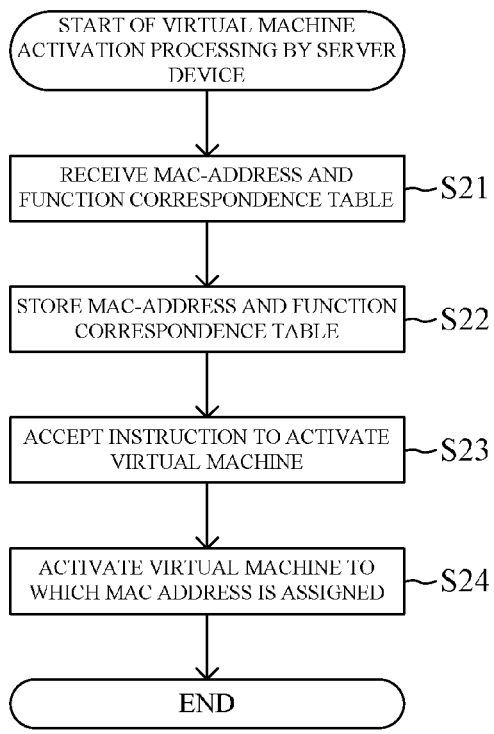
FIG. 11 is a flowchart for describing virtual machine activation processing.
Figure 12:
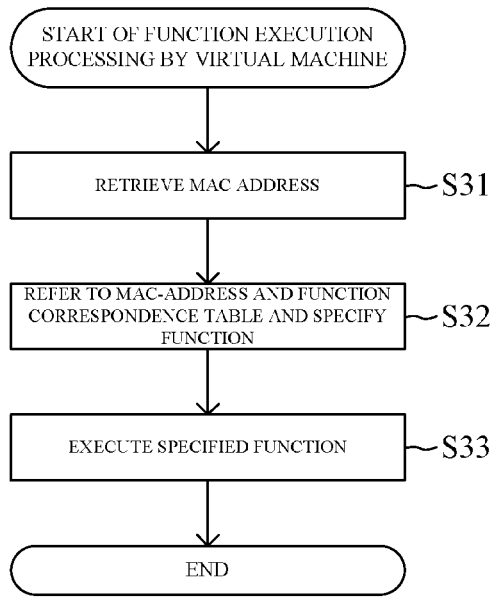
FIG. 12 is a flowchart for describing function execution processing.

Now a first exemplary embodiment of the present invention will be described referring to FIGS. 5 to 12. FIGS. 5 to 9 are views for describing the configuration of a virtual server system in the first exemplary embodiment. FIGS. 10 to 12 are views for describing the operation of the virtual server system.

(Configuration)

Figure 5:
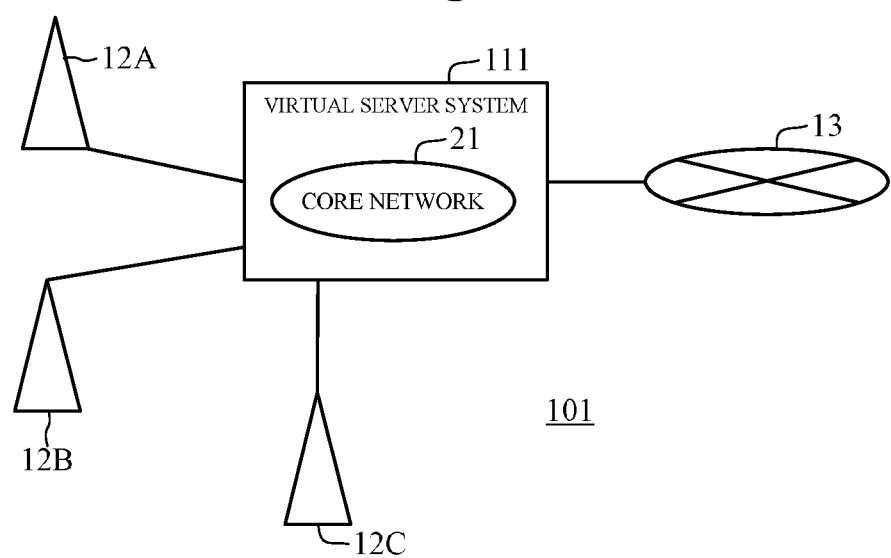
FIG. 5 is a diagram showing the configuration of a communication system according to a first exemplary embodiment of the present invention.

FIG. 5 is a diagram showing the overview of a communication system 101 including a virtual server system 111 (a virtual system). In the communication system 101 shown in FIG. 5, the same components as in the mobile core network system 1 shown in FIG. 1 are denoted by the same reference numerals. In other words, the communication system 101 shown in FIG. 5 is different in including the virtual server system 111 instead of the blade server system 11 shown in FIG. 1. Therefore, the configuration of the virtual server system 111 will be specifically described.

Figure 6:
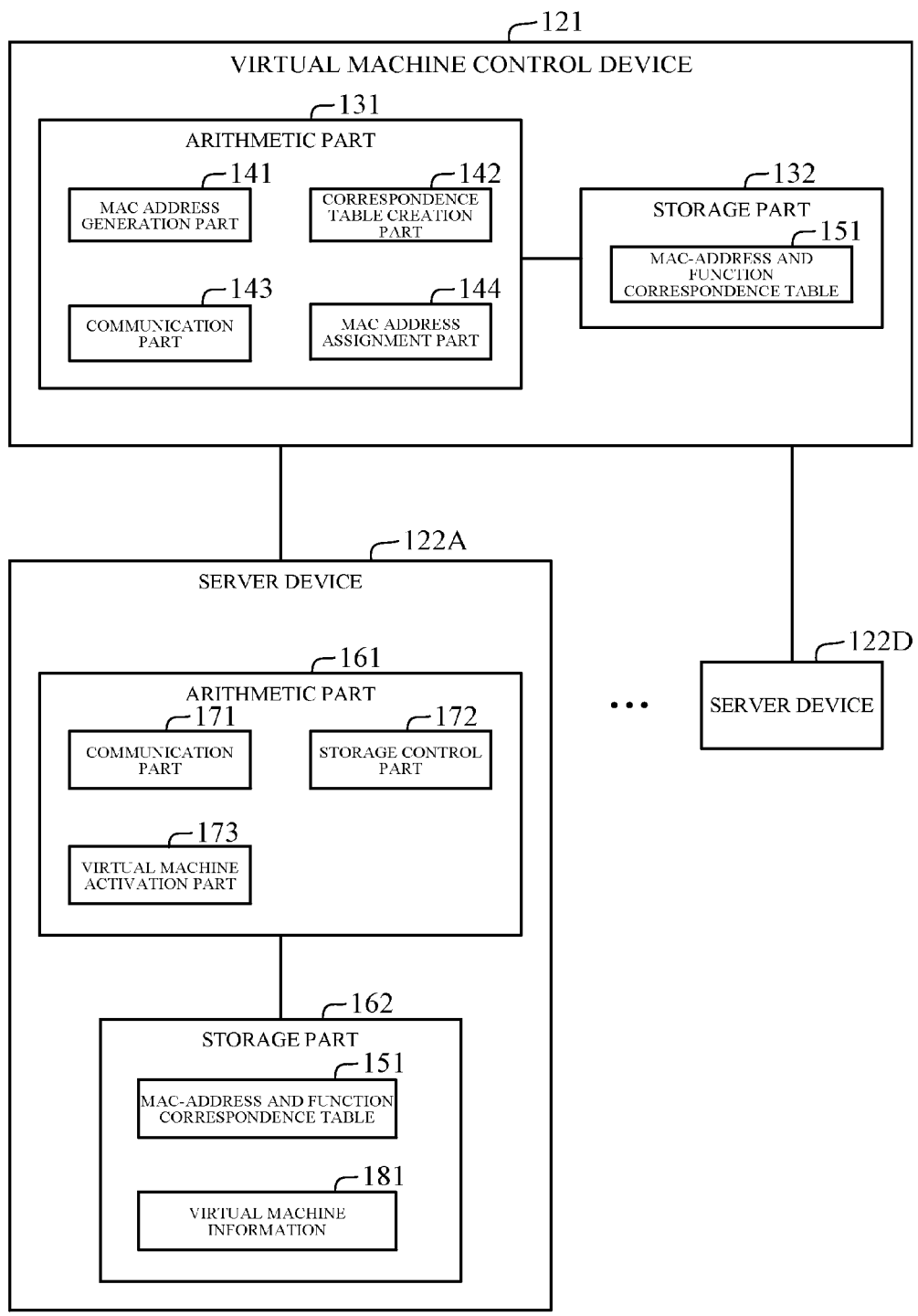
FIG. 6 is a block diagram showing the configuration of a virtual server system according to the first exemplary embodiment of the present invention.
Figure 8:
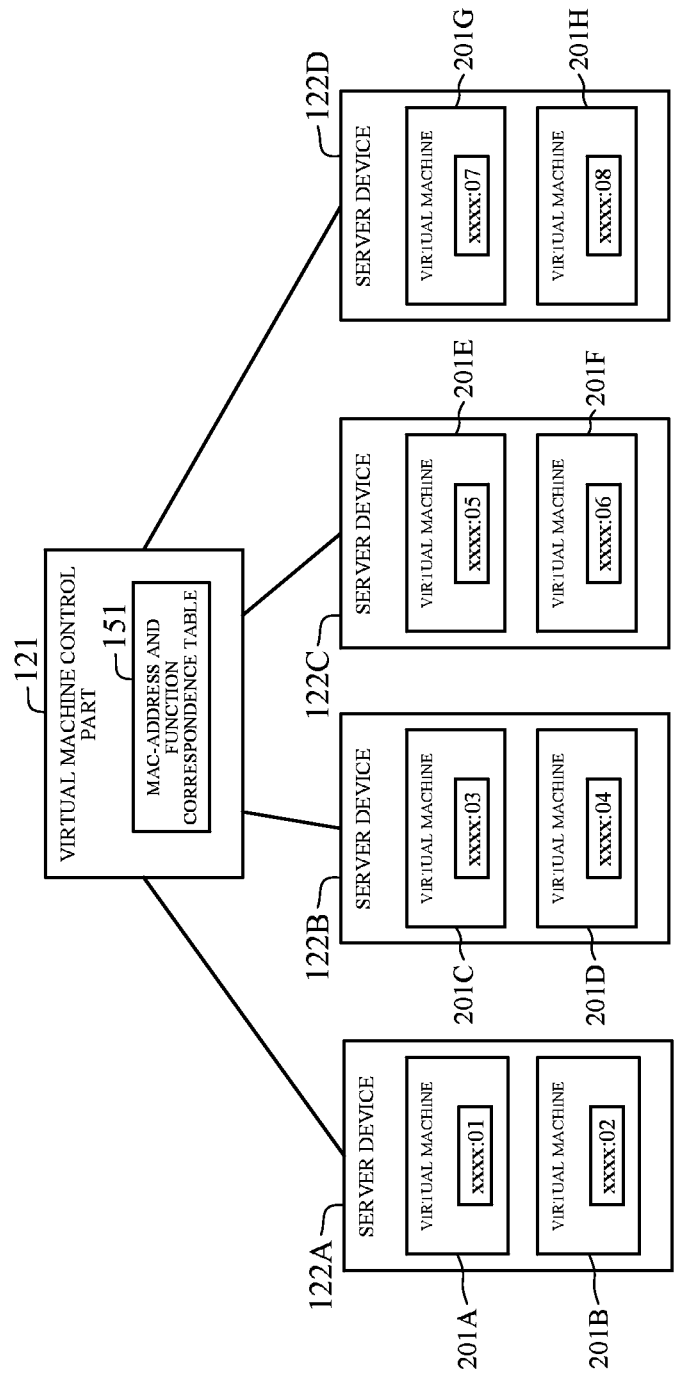
FIG. 8 is a diagram for describing assignment of virtual machines.

FIG. 6 is a block diagram showing the configuration of the virtual server system 111. The virtual server system 111 shown in FIG. 6 includes a virtual machine control device 121 (an information processing device) and four server devices 122, namely, server devices 122A to 122D. The number of the server devices 122 is not limited to four, and may be one, two or three and may be five or more.

The virtual machine control device 121 creates a MAC-address and function correspondence table 151 (a function correspondence table) associating a virtual MAC (Media Access Control) address (identification information) with a function (for example, the abovementioned functions a to d), and stores the created table into a storage part 132.

Subsequently, the virtual machine control device 121 instructs each of the server devices 122 to activate a virtual machine to which a virtual MAC address is assigned, on the basis of the created MAC-address and function correspondence table 151. Then, the server device 122 activates the virtual machine to which the virtual MAC address is assigned, in response to the virtual machine activation instruction made by the virtual machine control device 121, and executes a function associated with the MAC address assigned to the virtual machine, on the virtual machine. Information for identifying a virtual machine is not limited to a MAC address, and may be information which can uniquely specify a virtual machine on a predetermined network, such as an IP (Internet Protocol) address. Below, the configuration of the virtual machine control device 121 and the server device 122 will be specifically described.

The virtual machine control device 121 includes an arithmetic part 131 and a storage part 132. The arithmetic part 131 is configured by a CPU, for example, and has a MAC address generation part 141 (an identification information generating means), a correspondence table creation part 142 (a correspondence table creating means), a communication part 143 (an identification information assigning means), and a MAC address assignment part 144 (the identification information assigning means). The storage part 132 stores the MAC-address and function correspondence table 151 created by the correspondence table creation part 142. The MAC-address and function correspondence table 151 will be described later, referring to FIG. 7.

Further, the server device 122 includes an arithmetic part 161 and a storage part 162. The arithmetic part 161 is configured by a CPU, for example, and has a communication part 171, a storage control part 172, and a virtual machine activation part 173 (a virtualizing means). Further, the storage part 162 stores the MAC-address and function correspondence table 151 and virtual machine information 181. The MAC-address and function correspondence table 151 stored by the storage part 162 is the same as the MAC-address and function correspondence table 151 stored by the storage part 132 of the virtual machine control device 121. Moreover, the virtual machine information represents information for building a virtual machine activated by the virtual machine activation part 173.

First, processing in which the virtual machine control device 121 creates the MAC-address and function correspondence table 151 will be described. To be specific, first, the MAC address generation part 141 generates a virtual MAC address. The MAC address generation part 141 automatically generates a virtual MAC address, for example, on the basis of a preset rule. For example, the MAC address generation part 141 generates the same number of virtual MAC addresses as a number obtained by multiplying a preset number of functions (for example, 4) by a redundancy number (namely, a product obtained by multiplying the number of functions by a redundancy number).

Next, the correspondence table creation part 142 creates the MAC-address and function correspondence table 151 (for example, see FIG. 7) which associates the MAC address generated by the MAC address generation part 141 and assigned to each of the virtual machines to be described later, with a preset function executed by the virtual machine among functions which the virtual machine can execute. The preset functions a to d are, for example, the session management function of a mobile phone and the like, the load balancing function, and the location information management function of a mobile phone and the like. Definitely, the functions are not limited to the four functions a to d, and may be one, two or three functions and may be five or more functions. For example, the correspondence table creation part 142 assigns a predetermined function to each of a plurality of MAC addresses so that the number of the functions assigned to each of the MAC addresses is uniform (for example, the MAC-address and function correspondence table 151). In other words, the correspondence table creation part 142 assigns the same function to different MAC addresses by a redundancy number. Subsequently, the correspondence table creation part 142 stores the created MAC-address and function correspondence table 151 into the storage part 132. Further, the communication part 143 transmits the created MAC-address and function correspondence table 151 to the respective server devices 122.

Then, the server device 122 receives the MAC-address and function correspondence table 151 transmitted from the virtual machine control device 121, and stores the received table into the storage part 162. Consequently, the virtual machine control device 121 and the plurality of server devices 122 can each hold the MAC-address and function correspondence table 151 which associates virtual MAC addresses with functions. The virtual machine control device 121 may transmit only a record including a MAC address assigned to a virtual machine which the transmission destination server device 122 is instructed to activate of the MAC-address and function correspondence table 151. Consequently, it is possible to decrease a communication data amount and also decrease the amount of data stored in each of the server devices 122.

Next, processing in which the server device 122 activates a virtual machine will be described. First, the MAC address assignment part 144 of the virtual machine control device 121 assigns a MAC address to a virtual machine to be activated by the server device 122. To be specific, because at least a virtual machine to be active and a virtual machine to be standby are placed in the different server devices 122, respectively, the MAC address assignment part 144 assigns the MAC addresses associated with the same function in the MAC-address and function correspondence table 151 to the different server devices 122 (specifically, the virtual machine activation parts 173). For example, the MAC address assignment part 144 refers to the MAC-address and function correspondence table 151 shown in FIG. 7 and acquires MAC addresses "xxxx: 01" and "xxxx: 05" associated with a "function a." Then, the MAC address assignment part 144 assigns the MAC address "xxxx: 01" associated with the "function a" to the server device 122A. Likewise, the MAC address assignment part 144 assigns the MAC address "xxxx: 05" associated with the "function a" to the server device 122C different from the server device 122A. Consequently, even if a failure or the like occurs in one server device 122 (for example, the server device 122A) and a function associated with a virtual machine cannot be executed, it is possible to cause a virtual machine which is associated with the same function and activated by another server device (for example, the server device 122C) to execute the function.

Then, the communication part 143 of the virtual machine control device 121 instructs activation of a virtual machine to which a virtual MAC address is assigned by the MAC address assignment part 144. In other words, the communication part 143 instructs the server devices 122 to activate virtual machines so that the respective virtual machines to which identification information associated with the same function is assigned are activated by the different server devices 122. For example, the communication part 143 instructs the server device 122A to activate the virtual machine to which the MAC address "xxxx: 01" is assigned.

Next, the communication part 171 of the server device 122 receives an instruction to activate a virtual machine transmitted from the virtual machine control device 121. Then, the virtual machine activation part 173 activates a plurality of virtual machines to which MAC addresses identifying virtual machines are assigned. These virtual machines can execute functions 152a to 152d (predetermined functions) as described later referring to FIG. 9. For example, the communication part 171 of the server device 122A receives an instruction to activate the virtual machine to which the MAC address "xxxx: 01" is assigned. In this case, the virtual machine activation part 173 activates the virtual machine to which the MAC address "xxxx: 01" is assigned. Subsequently, by repetition of execution of the same processing, for example, the server devices 122A to 122D activate eight virtual machines 201A to 201H (number of functions 4×redundancy number 2) in total (see FIG. 8, for example). Then, the server device 122 stores information of the activated virtual machine 201 as the virtual machine information 181 into the storage part 162.

Now referring to FIG. 9, the configuration of the virtual machine 201 will be described. FIG. 9 is a block diagram showing the configuration of the virtual machine 201. The virtual machine 201 shown in FIG. 9 includes an arithmetic part 211, a storage part 212, a network driver 213, and a MAC address provision part 214. The storage part 212 stores the MAC-address and function correspondence table 151, and the functions 152a to 152d. The MAC-address and function correspondence table 151 and the functions 152a to 152d are stored when the virtual machine 201 is created. For example, they are information previously stored in the storage part 162 of the server device 122. The functions 152a to 152d are all functions that can be executed by the plurality of virtual machines 201. Because the virtual machine 201 has all the functions 152a to 152d that can be executed by the plurality of virtual machines 201, even if the MAC-address and function correspondence table 151 is updated by the virtual machine control device 121 and a function to execute is changed (for example, changed from the "function a" to the "function d"), the virtual machine 201 can quickly execute the changed function.

Meanwhile, the storage part 212 is not limited to storing all functions that the respective virtual machines 201 can execute (for example, the functions 152a to 152d), and may store at least one function 152 that the virtual machine 201 executes among the functions that the virtual machine 201 can execute. Moreover, in a case where a function to be executed by the virtual machine 201 is not stored in the storage part 212, the virtual machine 201 can access the server device 122 or the virtual machine control device 121 and acquire the function to be executed by the virtual machine 201. Consequently, in a case where a certain function is not stored in the virtual machine 201, the virtual machine 201 can quickly acquire and execute the function.

The MAC address provision part 214 is, for example, a virtual network interface, and holds a MAC address assigned by the server device 122 when activated. For example, the MAC address provision part 214 of the virtual machine 201A activated by the server device 122A holds the MAC address "xxxx: 01."

The arithmetic part 211 is configured by, for example, a virtual CPU, and has a function specification part 221 and a function execution part 222. The function specification part 221 retrieves a MAC address held by the MAC address provision part 214 via the network driver 213. For example, the function specification part 221 of the virtual machine 201A retrieves the MAC address "xxxx: 01" from the MAC address provision part 214.

Further, the function specification part 221 refers to the MAC-address and function correspondence table 151 stored in the storage part 212 and specifies a function. For example, when retrieving the MAC address "xxxx: 01" assigned to the virtual machine 201A, the function specification part 221 of the virtual machine 201A refers to the MAC-address and function correspondence table 151 shown in FIG. 9, and specifies the "function a" associated with the MAC address "xxxx: 01." In other words, the function specification part 221 of the virtual machine 201A specifies the "function a," which is a function associated in the MAC-address and function correspondence table 151, on the basis of the MAC address "xxxx: 01" associated with the virtual machine itself. Then, the function execution part 222 executes the function specified by the function specification part 221 (for example, the function a).

Thus, it is possible to specify a function to be executed by each virtual machine by using a virtual MAC address as identification information instead of a blade number. As a result, it is possible to perform virtualization while keeping association of a function assigned to each blade server of a blade server system, and it is possible to effectively use hardware resources. Moreover, because the respective virtual machines having MAC addresses associated with the same function are assigned to the different server devices 122, it is possible to realize high availability while maintaining a redundant configuration.

(Operation)

Next, referring to FIGS. 10 to 12, the operation of the virtual server system 111 will be described. FIG. 10 is a flowchart describing virtual machine control processing by the virtual machine control device 121. FIG. 11 is a flowchart describing virtual machine activation processing by the server device 122. FIG. 12 is a flowchart describing function execution processing by the virtual machine 201.

First, referring to FIG. 10, virtual machine control processing by the virtual machine control device 121 will be described. In the virtual machine control processing shown in FIG. 10, first, the MAC address generation part 141 generates a MAC address (step S1). For example, the MAC address generation part 141 generates the same number of virtual MAC addresses as a number obtained by multiplying the number of previously set functions (for example, four) by a redundancy number.

Next, the correspondence table creation part 142 creates the MAC-address and function correspondence table 151 (step S2). For example, the correspondence table creation part 142 creates the MAC-address and function correspondence table 151 that associates the MAC address acquired in step S1 with a preset function as shown in FIG. 7. Subsequently, the correspondence table creation part 142 stores the MAC-address and function correspondence table 151 created in step S2 into the storage part 132 (step S3). Then, the communication part 143 of the virtual machine control device 121 transmits the MAC-address and function correspondence table 151 created in step S2 to the server device 122 (step S4).

Subsequently, the communication part 171 of the server device 122 receives the MAC-address and function correspondence table 151 transmitted from the virtual machine control device 121 in step S4 in FIG. 10 (step S21 in FIG. 11). Then, the storage control part 172 of the server device 122 stores the MAC-address and function correspondence table 151 received in step S21 into the storage part 162 (step S22).

Next, in step S5 in FIG. 10, the MAC address assignment part 144 of the virtual machine control device 121 assigns a MAC address to a virtual machine which the server device 122 is to activate (step S5 in FIG. 10). To be specific, in order to locate a virtual machine to be active and a virtual machine to be standby into the different server devices 122, respectively, the MAC-address assignment part 144 assigns virtual machines having MAC addresses associated with the same function to the different server devices 122, respectively. For example, the MAC address assignment part 144 assigns the MAC address "xxxx: 01" associated with the "function a" to the server device 122A, and likewise assigns the MAC address "xxxx: 05" associated with the "function a" to the server device 122C different from the server device 122A.

Then, the communication part 143 of the virtual machine control device 121 instructs the server device 122 to activate the virtual machine to which the MAC address is assigned in step S5 (step S6). For example, the communication part 143 instructs the server device 122A to activate the virtual machine to which the MAC address "xxxx: 01" is assigned. After step S6, the virtual machine control processing shown in FIG. 10 ends.

Next, in step S23 shown in FIG. 11, the communication part 171 of the server device 122 receives the instruction to activate the virtual machine transmitted in step S6 in FIG. 10 (step S23 in FIG. 11). Then, the virtual machine activation part 173 of the server device 122 activates the virtual machine to which the MAC address is assigned (step S24). For example, when receiving an instruction to activate the virtual machine to which the MAC address "xxxx: 01" is assigned from the communication part 171, the virtual machine activation part 173 activates the virtual machine to which the MAC address "xxxx: 01" is assigned. The MAC address assigned to the virtual machine is held by the MAC address provision part 214 of the activated virtual machine 201. After step S24, the virtual machine activation processing shown in FIG. 11 ends.

Consequently, the virtual machine control device 121 and the plurality of server devices 122 can hold the MAC-address and function correspondence table 151 in which virtual MAC addresses are associated with functions. In other words, it is possible to use a MAC address as identification information.

Further, the virtual machine control device 121 instructs the server devices 122 to activate the virtual machines 201 so that the respective virtual machines 201 to which identification information associated with the same function is assigned are activated by the different server devices 122. Therefore, for example, even if a failure or the like occurs in the server device 122A and the "function a" associated with the virtual machine 201A cannot be executed, it is possible to cause the virtual machine 201E associated with the same "function a" and activated by the other server device 122C to execute the "function a." Thus, the active virtual machine 201 (for example, the virtual machine 201A) and the standby virtual machine 201 (for example, the virtual machine 201E) are caused to operate by the different server devices 122 (for example, the server devices 122A and 122C), so that it is possible to maintain a redundant configuration and realize high availability.

Next, referring to FIG. 12, function execution processing by the virtual machine 201 will be described. In the function execution processing shown in FIG. 12, first, the function specification part 221 retrieves a MAC address (step S31). For example, the function specification part 221 of the server device 122A retrieves the MAC address "xxxx: 01" held by the MAC address provision part 214, via the network driver 213.

Subsequently, the function specification part 221 refers to the MAC-address and function correspondence table 151 stored in the storage part 212 and specifies a function (step S32). For example, when retrieving the MAC address "xxxx: 01" in step S31, the function specification part 221 refers to the MAC-address and function correspondence table 151 shown in FIG. 7 and specifies the "function a" associated with the MAC address "xxxx: 01." Then, the function execution part 222 executes the function specified in step S32 (for example, the function a) (step S33). After step S33, the function execution processing shown in FIG. 12 ends.

Consequently, in a case where a blade server or the like to which a function is previously assigned is virtualized, it is possible to specify and execute a function assigned to the virtual machine 201 on the basis of the MAC-address and function correspondence table 151 and identification information of the virtual machine 201. As a result, even when functions are assigned to the respective blade servers, it is possible to virtualize the blade servers, and it is possible to effectively use hardware resources.

<Second Exemplary Embodiment>

Figure 13:
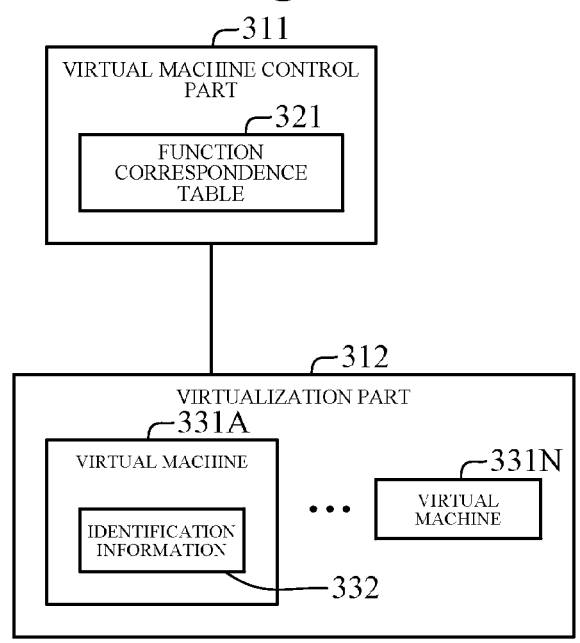
FIG. 13 is a block diagram showing the configuration of a virtual system according to a second exemplary embodiment of the present invention.

Next, a virtualization system 301 according to a second exemplary embodiment of the present invention will be described referring to FIG. 13.

The virtualization system 301 according to the second exemplary embodiment includes:

a virtualization part 312 (a virtualizing means) activating a virtual machine 331A to 331N (hereinafter, referred to as the virtual machine 331) to which identification information 332 identifying the virtual machine 331 is assigned and which is capable of executing a predetermined function;

a plurality of virtual machines 331 activated by the virtualizing means 312; and a virtual machine control part 311 (a correspondence table creating means) creating a function correspondence table 321 in which the identification information 332 assigned to each of the virtual machines 331 is associated with a function to be executed by the virtual machine (for example, the virtual machine 331A) among functions that can be executed by the virtual machines 331.

The virtual machine 331 specifies an associated function in the function correspondence table 321 on the basis of the identification information 332 assigned to the virtual machine 331, and executes the specified function.

According to the above configuration, the virtualization system 301 activates the plurality of virtual machines 332 to each of which the identification information 332 (for example, a MAC address) identifying the virtual machine 331 is assigned and which can execute a predetermined function. Then, the activated virtual machine 331 specifies a function previously associated with the identification information 332 of the virtual machine 331, and executes the specified function. Thus, it is possible to specify a function which the virtual machine 331 is to execute, on the basis of the identification information 332 assigned to each of the plurality of virtual machines 331 and the function correspondence table 321. As a result, it is possible to virtualize a blade server and effectively use hardware resources.

Although the present invention is described above referring to the exemplary embodiments, the present invention is not limited to the exemplary embodiments. The configurations and details of the present invention can be changed and modified in various manners that can be understood by one skilled in the art within the scope of the present invention.

<Supplementary Notes>

The whole or part of the exemplary embodiments disclosed above can be described as, but not limited to, the following supplementary notes.

(Supplementary Note 1)

A virtualization system comprising:

a virtualizing means for activating a virtual machine to which identification information identifying the virtual machine is assigned and which is capable of executing a predetermined function;

a plurality of virtual machines activated by the virtualizing means; and a correspondence table creating means for creating a function correspondence table in which the identification information assigned to each of the virtual machines is associated with a function to be executed by the virtual machine among functions that can be executed by the virtual machines, wherein the virtual machine specifies an associated function in the function correspondence table on a basis of the identification information assigned to the virtual machine, and executes the specified function.

According to the above configuration, a virtualization system activates a plurality of virtual machines to each of which identification information (for example, a MAC address) identifying the virtual machine is assigned and which can execute a predetermined function. Then, the activated virtual machine specifies a function previously associated with the identification information of the virtual machine. Thus, it is possible to specify and execute a function which the virtual machine is to execute, on the basis of the identification information assigned to each of the plurality of virtual machines and the function correspondence table. As a result, it is possible to virtualize a blade server and effectively use hardware resources.

(Supplementary Note 2)

The virtualization system according to Supplementary Note 1, comprising a plurality of virtualizing means which activate the respective virtual machines to which the identification information associated with a same function in the function correspondence table are assigned.

According to the above configuration, virtual machines to which identification information associated with the same function in the function correspondence table are assigned are activated by different virtualizing means. Therefore, even when a failure or the like occurs in one of the virtualizing means and a virtual machine cannot execute a predetermined function, it is possible to cause a virtual machine executing the same function and activated by the other virtualizing means to execute the function. Thus, because an active virtual machine and a standby virtual machine are caused to operate by different virtualizing means, it is possible to maintain a redundant configuration and realize high availability.

(Supplementary Note 3)

The virtualization system according to Supplementary Note 1 or 2, wherein the virtualizing means activates the virtual machine so as to be capable of executing all functions executed by the plurality of virtual machines.

According to the above configuration, when activating a virtual machine, the virtualizing means sets so as to be capable of executing all functions executed by a plurality of virtual machines. Consequently, even when the function correspondence table created by the correspondence table creating means is updated and a function to be executed by the virtual machine is changed, it is possible to quickly execute the changed function.

(Supplementary Note 4)

The virtualization system according to any of Supplementary Notes 1 to 3, comprising an identification information assigning means for instructing the virtualizing means to activate the virtual machine to which the identification information for uniquely specifying the virtual machine on a predetermined network is assigned, wherein the virtualizing means activates the virtual machine to which the identification information is assigned, in response to an instruction from the identification information assigning means.

According to the above configuration, because a virtual machine to which identification information which can uniquely specify the virtual machine on a network is activated, it is possible to specify a function to be executed by the virtual machine on the basis of the identification information of the virtual machine. As a result, the virtual machine can execute the function associated with the identification information of the virtual machine.

(Supplementary Note 5)

The virtualization system according to any of Supplementary Notes 1 to 4, comprising an identification information generating means for generating, as the identification information, an equal number of the identification information to a number obtained by multiplying a number of all functions executed by the plurality of virtual machines by a preset redundancy number.

According to the above configuration, because an equal number of identification information (for example, virtual MAC addresses) to a number obtained by multiplying the number of all the functions by the redundancy number are generated as the identification information, it is possible cause the virtual machines to execute predetermined functions while maintaining the redundancy number.

(Supplementary Note 6)

An information processing method comprising:

activating a plurality of virtual machines to each of which identification information identifying the virtual machine is assigned and each of which is capable of executing a predetermined function; and creating a function correspondence table in which the identification information assigned to each of the virtual machines is associated with a function to be executed by the virtual machine among functions that can be executed by the virtual machines, wherein the virtual machine specifies an associated function in the function correspondence table on a basis of the identification information assigned to the virtual machine, and executes the specified function.

(Supplementary Note 7)

The information processing method according to Supplementary Note 6, wherein a plurality of virtualizing means activate the respective virtual machines to which the identification information associated with a same function in the function correspondence table are assigned.

(Supplementary Note 8)

An information processing device comprising:

a correspondence table creating means for creating a function correspondence table in which identification information identifying each of a plurality of virtual machines is associated with a function to be executed by the virtual machine among functions that can be executed by the virtual machines; and an identification information assigning means for giving an instruction to activate the respective virtual machines to which the identification information associated with a same function in the function correspondence table created by the correspondence table creating means are assigned, to different server devices among a plurality of server devices activating the virtual machines.

(Supplementary Note 9)

An information processing method comprising:

creating a function correspondence table in which identification information identifying each of a plurality of virtual machines is associated with a function to be executed by the virtual machine among functions that can be executed by the virtual machines; and giving an instruction to activate the respective virtual machines to which the identification information associated with a same function in the created function correspondence table are assigned, to different server devices among a plurality of server devices activating the virtual machines.

(Supplementary Note 10)

A computer program comprising instructions for causing an information processing device to realize:

a correspondence table creating means for creating a function correspondence table in which identification information identifying each of a plurality of virtual machines is associated with a function to be executed by the virtual machine among functions that can be executed by the virtual machines; and an identification information assigning means for giving an instruction to activate the respective virtual machines to which the identification information associated with a same function in the function correspondence table created by the correspondence table creating means are assigned, to different server devices among a plurality of server devices activating the virtual machines.

The computer program described in the exemplary embodiments and the supplementary notes is stored in a storage device or recorded on a computer-readable recording medium. For example, the recording medium is a portable medium such as a flexible disk, an optical disk, a magneto-optical disk, and a semiconductor memory.

Although the present invention is described above referring to the exemplary embodiments, the present invention is not limited to the above exemplary embodiments. The configurations and details of the present invention can be changed and modified in various manners that can be understood by one skilled in the art within the scope of the present invention.

The present invention is based upon and claims the benefit of priority from Japanese patent application No. 2013-031731, filed on Feb. 21, 2013, the disclosure of which is incorporated herein in its entirety by reference.

DESCRIPTION OF REFERENCE NUMERALS 101 communication system
111 virtual server system
121 virtual machine control device
122 server device
131 arithmetic part
132 storage part
141 MAC address creation part
142 correspondence table creation part
143 communication part
144 MAC address assignment part
151 MAC-address and function correspondence table
162 storage part
171 communication part
172 storage control part
173 virtual machine activation part
201 virtual machine
211 arithmetic part
212 storage part
213 network driver
214 MAC address provision part
221 function specification part
222 function execution part
311 virtual machine control part
312 virtualization part

The invention claimed is:

1. A virtualization system comprising:
a server comprising memory storing first instructions and one or more first processors configured to execute the first instructions to activate a plurality of virtual machines, each of the plurality of virtual machines being assigned identification information and capable of executing a predetermined function; and
a virtual machine control device comprising memory storing second instructions and one or more second processors configured to execute the second instructions to:
create a function correspondence table in which the assigned identification information is associated with a predetermined function that is executed by at least one of the plurality of virtual machines, wherein the at least one of the plurality of virtual machines specifies the associated predetermined function in the function correspondence table based on the assigned identification information; and
generate a number of items of the identification information equal to a number of predetermined functions executed by the plurality of virtual machines multiplied by a redundancy value.

2. The virtualization system according to claim 1, wherein the one or more first processors are further configured to execute the first instructions to activate all virtual machines the assigned identification information associated with the same function in the function correspondence table.

3. The virtualization system according to claim 1, wherein the one or more first processors are further configured to execute the first instructions to activate a virtual machine that executes all predetermined functions of the plurality of virtual machines.

4. The virtualization system according to claim 1, wherein the one or more first processors are further configured to:
activate, in response to receiving an instruction from the virtual machine control device, a virtual machine that is assigned identification information that uniquely specifies the virtual machine on a predetermined network.

5. The virtualization system according to claim 1, wherein the assigned identification information includes a Media Access Control (MAC) address.

6. The virtualization system according to claim 1, wherein the predetermined function includes at least one of a session management function, load balancing function, and location information management function.

7. An information processing method comprising:
activating a plurality of virtual machines, each of the plurality of virtual machines being assigned identification information and capable of executing a predetermined function;
creating a function correspondence table in which the assigned identification information is associated with a predetermined function that is executed by at least one of the plurality of virtual machines, wherein the at least one of the plurality of virtual machines specifies the associated predetermined function in the function correspondence table based on the assigned identification information; and
generating a number of items of the identification information equal to a number of predetermined functions executed by the plurality of virtual machines multiplied by a redundancy value.

8. The information processing method according to claim 7, further comprising:
activating all virtual machines assigned identification information associated with the same function in the function correspondence table.

9. The information processing method according to claim 7, further comprising:
activating a virtual machine that executes all predetermined functions of the plurality of virtual machines.

10. The information processing method according to claim 7, further comprising:
activating, in response to receiving an instruction from the virtual machine control device, a virtual machine that is assigned identification information that uniquely specifies the virtual machine on a predetermined network.

11. The information processing method according to claim 7, wherein the assigned identification information includes a Media Access Control (MAC) address.

12. An information processing device comprising:
a memory storing instructions; and
one or more processors configured to execute the instructions to:
create a function correspondence table in which assigned identification information is associated with a predetermined function that is executed by at least one of the plurality of virtual machines;
activate all virtual machines assigned identification information associated with the same function in the function correspondence table; and
generate a number of items of the identification information equal to a number of predetermined functions executed by the plurality of virtual machines multiplied by a redundancy value.

13. An information processing method comprising:
creating a function correspondence table in which assigned identification information is associated with a predetermined function that is executed by at least one of the plurality of virtual machines;
activating all virtual machines assigned identification information associated with the same function in the created function correspondence table; and
generating a number of items of the identification information equal to a number of predetermined functions executed by the plurality of virtual machines multiplied by a redundancy value.

14. The information processing method according to claim 13, further comprising:
activating a virtual machine that executes all predetermined functions of the plurality of virtual machines.

15. The information processing method according to claim 13, further comprising:
activating, in response to receiving an instruction from the virtual machine control device, a virtual machine that is assigned identification information that uniquely specifies the virtual machine on a predetermined network.

16. The information processing method according to claim 13, further comprising:
activating all virtual machines assigned identification information associated with the same function in the function correspondence table.

17. A non-transitory computer-readable medium storing a program comprising instructions for causing an information processing device to perform operations comprising:
creating a function correspondence table which assigned identification information is associated with a predetermined function that is executed by at least one of the plurality of virtual machines;
activating all virtual machines assigned identification information associated with the same function in the created function correspondence table; and
generating a number of items of the identification information equal to a number of predetermined functions executed by the plurality of virtual machines multiplied by a redundancy value.

18. The non-transitory computer-readable according to claim 17, further comprising:
activating a virtual machine that executes all predetermined functions of the plurality of virtual machines.

19. The non-transitory computer-readable according to claim 17, further comprising:
activating, in response to receiving an instruction from the virtual machine control device, a virtual machine that is assigned identification information that uniquely specifies the virtual machine on a predetermined network.

20. The information processing method according to claim 17, further comprising:
activating all virtual machines assigned identification information associated with the same function in the function correspondence table.

* * * * *

UNITED STATES PATENT AND TRADEMARK OFFICE
CERTIFICATE OF CORRECTION

| | | |
|---|---|---|
| PATENT NO. | : 9,672,059 B2 | Page 1 of 1 |
| APPLICATION NO. | : 14/768942 | |
| DATED | : June 6, 2017 | |
| INVENTOR(S) | : Hiroshi Shimamoto | |

It is certified that error appears in the above-identified patent and that said Letters Patent is hereby corrected as shown below:

In the Claims

In Claim 2, Column 14, Lines 63-64, "machines the assigned" should read --machines assigned--.

In Claim 17, Column 16, Line 36, "table which" should read --table in which--.

In Claim 18, Column 16, Line 47, "computer-readable according to" should read --computer-readable medium according to--.

In Claim 19, Column 16, Line 51, "computer-readable according to" should read --computer-readable medium according to--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*